US006987985B2

(12) United States Patent
Purkayastha et al.

(10) Patent No.: US 6,987,985 B2
(45) Date of Patent: Jan. 17, 2006

(54) WIRELESS COMMUNICATION COMPONENTS AND METHODS FOR MULTIPLE SYSTEM COMMUNICATIONS

(75) Inventors: Debashish Purkayastha, Lansdale, PA (US); Amarnath Chitti, East Norriton, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 10/737,369

(22) Filed: Dec. 16, 2003

(65) Prior Publication Data

US 2004/0248615 A1    Dec. 9, 2004

Related U.S. Application Data

(60) Provisional application No. 60/476,322, filed on Jun. 6, 2003.

(51) Int. Cl.
*H04M 1/00* (2006.01)

(52) U.S. Cl. ............................... 455/552.1; 455/432.1; 455/435.2; 455/436; 455/550.1; 455/553.1; 370/331; 370/334

(58) Field of Classification Search ............. 455/432.1, 455/435.1–435.2, 436–439, 442–444, 448, 455/550.1, 552.1, 553.1; 370/331, 332, 334
See application file for complete search history.

(56) References Cited

U.S. PATENT DOCUMENTS

| 5,561,844 | A | * | 10/1996 | Jayapalan et al. | 455/442 |
| 5,737,703 | A | * | 4/1998 | Byrne | 455/442 |
| 5,991,626 | A | * | 11/1999 | Hinz et al. | 455/436 |
| 6,023,461 | A | * | 2/2000 | Raychaudhuri et al. | 370/331 |
| 6,385,451 | B1 | * | 5/2002 | Kalliokulju et al. | 455/437 |
| 6,526,034 | B1 | * | 2/2003 | Gorsuch | 370/338 |
| 6,577,868 | B1 | * | 6/2003 | Vialen et al. | 55/441 |
| 6,775,533 | B2 | * | 8/2004 | Kakani et al. | 455/403 |
| 2001/0009853 | A1 | * | 7/2001 | Arimitsu | 455/434 |
| 2002/0068570 | A1 | * | 6/2002 | Abrol et la. | 455/438 |
| 2002/0173338 | A1 | * | 11/2002 | Neumann et al. | 455/552 |

* cited by examiner

Primary Examiner—Stephen M. D'Agosta
(74) Attorney, Agent, or Firm—Volpe and Koenig, P.C.

(57) ABSTRACT

A mobile wireless transmit/receive unit (WTRU), components and methods therefor provide continuous communications capability while switching from a wireless connection with a first type of wireless system to a wireless connection with a second type of wireless system. Preferably, the WTRU is configured to switch wireless links from a Universal Mobile Telecommunications System (UMTS) to a wireless local area network (WLAN) or vice versa during a continuous communication session. The invention is preferably implemented by providing an Application Broker for control signaling and a Communications broker for user data flow which may be embodied in an application specific integrated circuit (ASIC).

12 Claims, 10 Drawing Sheets

WIRELESS COMMUNICATION COMPONENTS AND METHODS FOR MULTIPLE SYSTEM COMMUNICATIONS

CROSS REFERENCE TO RELATED APPLICATION(S)

This application claims priority from U.S. Provisional Application No. 60/476,322 filed on Jun. 6, 2003, which is incorporated by reference as if fully set forth herein.

FIELD OF INVENTION

This application relates to components and methods for wireless communication in multiple systems, and, in particular, to mobile wireless transmit/receive units (WTRUs) capable of continuous communications while switching from a wireless connection with a first type of wireless system to a wireless connection with a second type of wireless system, such as from a Universal Mobile Telecommunications System (UMTS) to a wireless local area network (WLAN) or vice versa.

BACKGROUND OF THE INVENTION

Wireless communication systems are well known in the art. Generally, such systems comprise communication stations which transmit and receive wireless communication signals between each other. For network systems such as mobile cellular systems, there are typically two types of communication stations, namely, base stations which provide access to the network infrastructure and wireless transmit/receive units (WTRUs) which conduct wireless communications with the base stations.

There is a growing dependence upon wireless communications in the home, office, and when traveling. It is not uncommon for a user to have several different WTRUs such as different home, office, and mobile wireless telephones. Accordingly, there is a need to replace the use of multiple WTRUs with a single WTRU which can be used in the home, office and when traveling.

In many commercial networks, a network of base stations is provided wherein each base station is capable of conducting multiple concurrent wireless communications with appropriately configured WTRUs. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute-Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1a. The UMTS network architecture includes a Core Network (CN) interconnected with a UMTS Terrestrial Radio Access Network (UTRAN) via an interface known as Iu which is defined in detail in the current publicly available 3GPP specification documents.

The UTRAN is configured to provide wireless telecommunication services to users through WTRUs, called User Equipments (UEs) in 3GPP, via a radio interface known as Uu. The UTRAN has base stations, known as Node Bs in 3GPP, which collectively provide for the geographic coverage for wireless communications with UEs. In the UTRAN, groups of one or more Node Bs are connected to a Radio Network Controller (RNC) via an interface known as Iub in 3GPP. The UTRAN may have several groups of Node Bs connected to different RNCs, two are shown in the example depicted in FIG. 1a. Where more than one RNC is provided in a UTRAN, inter-RNC communication is performed via an Iur interface.

A UE will generally have a Home UMTS Network (HN) with which it is registered and through which billing and other functions are processed. By standardizing the Uu interface, UEs are able to communicate via different UMTS networks that, for example, serve different geographic areas. In such case the other network is generally referred to as a Foreign Network (FN).

Under current 3GPP specifications, the Core Network of a UE's HN serves to coordinate and process the functions of Authentication, Authorization and Accounting (AAA functions). When a UE travels beyond its Home UMTS Network, the HN's Core Network facilitates the UE's use of a Foreign Network by being able to coordinate the AAA functions so that the FN will permit the UE to conduct communications. To assist in implementing this activity, the Core Network includes a Home Location Register (HLR) which tracks the UEs for which it is the HN and a Visitor Location Register (VLR). A Home Service Server (HSS) is provided in conjunction with the HLR to process the AAA functions.

Under current 3GPP specifications, the Core Network is configured with connectivity to external systems such as Public Land Mobile Networks (PLMN), Public Switch Telephone Networks (PSTN), Integrated Services Digital Network (ISDN) and other Real Time (RT) services via an RT service interface. A Core Network also supports Non-Real Time services with the Internet. External connectivity of the Core Network to other systems enables users using UEs to communicate via their Home UMTS Network beyond the area served by the HN's UTRAN. Visiting UEs can likewise communicate via a visited UMTS Network, beyond the area served by the visited UMTS's UTRAN.

Under current 3GPP specifications, the Core Network provides RT service external connectivity via a Gateway Mobile Switching Center (GMSC). The Core Network provides NRT service, known as General Packet Radio Service (GPRS), external connectivity via a Gateway GPRS Support Node (GGSN). In this context, a particular NRT service may actually appear to a user to be a real time communication due to the communication speed and associated buffering of the TDD data packets forming the communication. One example of this is voice communication via the Internet which can appear to the user as a normal telephone call conducted by a switching network, but is actually being conducted using an Internet Protocol (IP) connection which provides Packet data Service.

A standard interface known as GI is generally used between a CN's GGSN and the Internet. The GI interface can be used with Mobile Internet Protocols, such as Mobile IP v4 or Mobile IP v6 as specified by the Internet Engineering Task Force (IETF).

Under current 3GPP specifications, to provide support for both RT and NRT services from external sources for radio linked UEs in a 3GPP system, the UTRAN must properly interface with the CN which is the function of the Iu interface. To do this, the Core Network includes a Mobile Switching Centre (MSC) that is coupled to the GMSC and a Serving GPRS Support Node (SGSN) that is coupled to the GGSN. Both are coupled with the HRL and the MSC is usually combined with the Visitor Location Register (VLR).

The Iu interface is divided between an interface for Circuit Switched communications (Iu-CS) and an interface for packet data via Packet Switched communications (Iu-PS). The MSC is connected to the RNCs of the UTRAN via the Iu-CS interface. The Serving GPRS Support Node (SGSN) is coupled to the UTRAN's RNCs via the Iu-PS interface for Packet Data Services.

The HLR/HSS is typically interfaced with the CS side of the Core Network, MSC and GMSC via an interface known as Gr which supports AAA functions through a Mobile Application Part (MAP) Protocol. The SGSN and the GGSN of the CN are connected using interfaces known as Gn and Gp.

Another type of wireless system, called a wireless local area network (WLAN), can be configured to conduct wireless communications with WTRUs equipped with WLAN modems. Currently, WLAN modems are being integrated into many traditional communicating and computing devices by manufactures. For example, cellular phones, personal digital assistants, and laptop computers are being built with one or more WLAN modems. Accordingly, there is an increasing need to facilitate communications among such WTRUs with WLAN modems as well as with different types of networks.

A popular wireless local area network environment with one or more WLAN Access Points (APs), i.e., base stations, is built according to the IEEE 802.11b standard. The wireless service areas for such WLANs may be restricted to specified well defined geographic areas known as "hot spots". Such wireless communication systems are advantageously deployed in areas such as airports, coffee shops, and hotels. Access to these networks usually requires user authentication procedures. Protocols for such systems are not yet fully standardized in the WLAN technology area, since the IEEE 802 family of standards is evolving. However, as noted above, the CN of UMTS networks are designed for facilitating communication with other networks such as WLANs.

In lieu of using a different WTRU in each different environment, WTRUs can be provided with both UMTS and WLAN capabilities, such as pocket PCs with separate UMTS and WLAN PCMCIA card adapters. Separate card components enable a user to use different types of networks via a single device, but does not provide a WTRU capable of switching from one type of network to another without a loss of connectivity. For example, a mobile WTRU communicating with or seeking to communicate with a target WTRU may travel into areas of poor signal quality where the communications with a particular type of network that serves the target WTRU becomes sporadic or nonexistent. In such cases, it would also be desirable if the WTRU can not only roam for within the same type of network, but also switch to a different type of network which maintaining a communication session on an ongoing basis.

SUMMARY

A mobile wireless transmit/receive unit (WTRU), components and methods therefor provide continuous communications capability while switching from a wireless connection with a first type of wireless system to a wireless connection with a second type of wireless system.

Preferably, the WTRU is configured to switch wireless links from a Universal Mobile Telecommunications System (UMTS) to a wireless local area network (WLAN) or vice versa during a continuous communication session. The invention is preferably implemented by providing a n Application Broker for control signaling and a Communications broker for user data flow which may be embodied in an application specific integrated circuit (ASIC).

A preferred WTRU in accordance with the invention includes a protocol engine having at least two wireless communication interfaces, each configured for wireless linking with a different type of wireless network. Each communication interface is preferably configured to pass control signals and user communication data to a common application processing component. An application broker is provided that is configured to monitor control signaling between the lower layer protocol engine and the upper layer application processing component. A communications broker is provided that has a data buffer and defines a switchable data path for user data between the upper layer application processing component and a selected one of the wireless interfaces. Preferably, the application broker is associated with the communications broker to control data buffering and data path switching by the communications broker such that data flowing to a first wireless interface of the protocol engine during a communication session is buffered while a wireless link is established with a different second wireless interface of the protocol engine for the communication session and the communication broker data path is switched to the second wireless interface and the buffered data is released therethrough after a wireless link is established for the communication session via the second wireless interface.

In one embodiment, the communication broker data path is configured to transport packet switched data and a data path is defined for circuit switch data between the upper layer application processing component and a UMTS wireless interface. However, this is not a limiting criteria.

Preferably, the application broker includes a link monitor and is configured to trigger the initiation of a wireless link through a different wireless interface based upon monitored link data meeting predetermined criteria. The application broker can also include an Application Session Manager configured to controls the signaling during the establishment of a wireless link through a different wireless interface and an inter-working unit configured to maintain and convert context information for transmission during the establishment of a wireless link through a different wireless interface. Additionally, the application broker can include a Subscriber Identity Module (SIM) reader configured to read a SIM containing the user's identity.

A preferred wireless link handover method is provided for a wireless transmit/receive unit (WTRU) for switching a wireless link from a first to a second type of wireless network during a communication session wherein the WTRU has a protocol engine having first and second wireless communication interface configured for wireless linking with the first and second types of wireless networks, respectively, each communication interface configured to pass control signals and user communication data to a common application processing component. A data buffer and a switchable data path for user data between the upper layer application processing component and a selected one of the wireless interfaces are provided. Control signaling is monitored between the lower layer protocol engine and the upper layer application processing component. The data buffer and data path switching are controlled such that data flowing to the first wireless interface of the protocol engine during the communication session is buffered while a wireless link is established with the second wireless interface of the protocol engine for the communication session and the data path is switched to the second wireless interface and the buffered data is released therethrough after a wireless link is established for the communication session via the second wireless interface.

Other objects and advantages of the present invention will be apparent to persons skilled in the art from the following description and accompanying drawings.

TABLE OF ACRONYMS

Figure 1A:
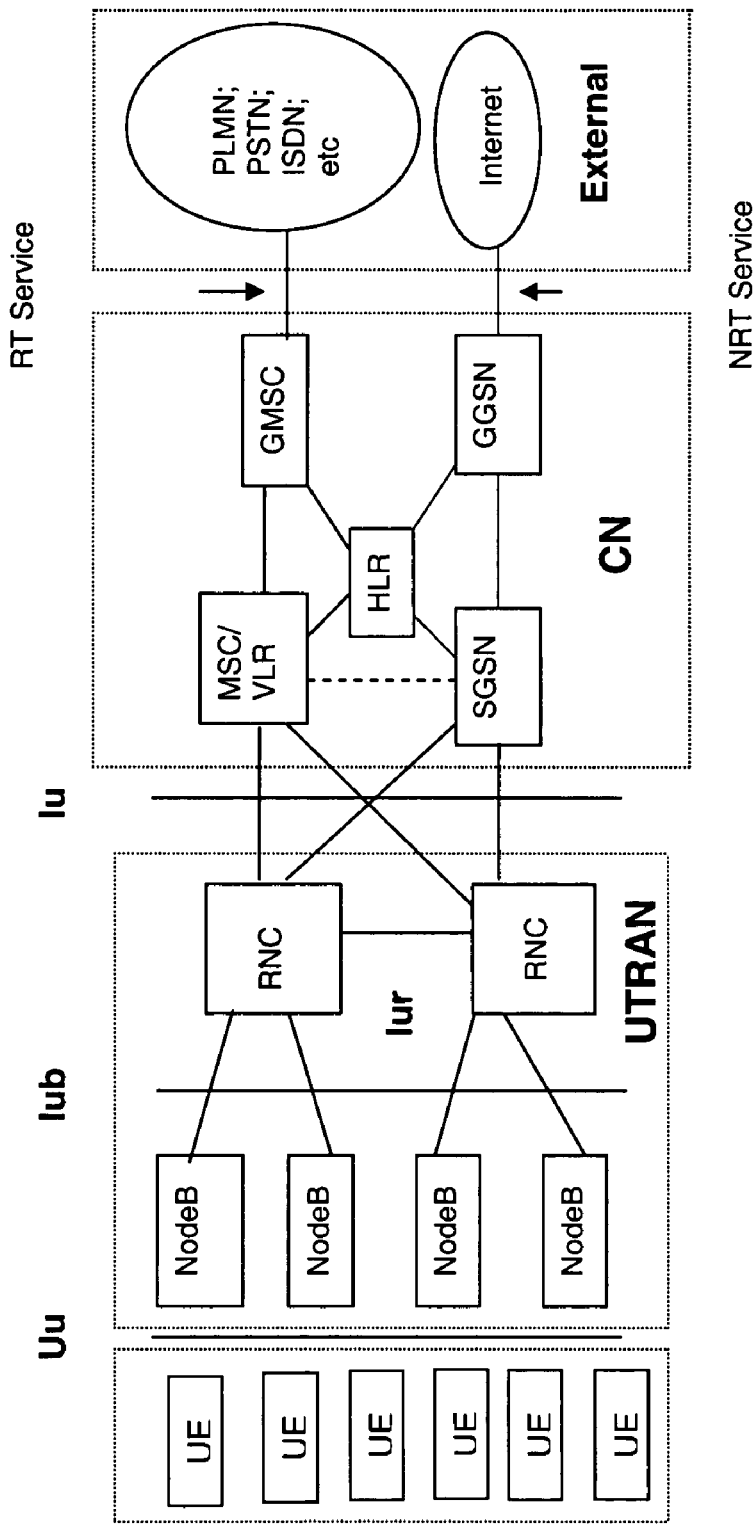
FIG. 1a is a schematic diagram of a typical UMTS system in accordance with current 3GPP specifications.

| | |
|---|---|
| 2G | Second Generation |
| 2.5G | Second Generation Revision |
| 3GPP | Third Generation Partnership Project |
| AAA | Authentication, Authorization and Accounting |
| AAL2 | ATM Adaptation Layer Type 2 |
| AAL5 | ATM Adaptation Layer Type 5 |
| AMR | A type of voice data compression |
| AP | Access Point (base station in WLAN) |
| APP | Applications broker |
| AS | Access Stratum |
| ASIC | Application Specific Integrated Circuit |
| ATM | Asynchronous Transfer Mode |
| CDMA | Code Division Multiple Access |
| CN | Core Network |
| CODECs | Coder/Decoders |
| COM | Communications broker |
| CP | Control Plane |
| CS | Circuit Switched |
| ETSI | European Telecommunications Standard Institute |
| ETSI SMG | ETSI - Special Mobile Group |
| FA | Forwarding Address |
| FN | Foreign Network |
| G.729 | A type of voice data compression |
| GGSN | Gateway GPRS Support Node |
| GMM | GPRS Mobility Management |
| GMSC | Gateway Mobile Switching Center |
| GPRS | General Packet Radio Service |
| GSM | Global System for Mobile Telecommunications |
| GTP | GPRS Tunneling Protocol |
| GW | Gateway |
| H.323/SIP | H.323 Format for a Session Initiated Protocol |
| HLR | Home Location Register |
| HN | Home Network |
| HSS | Home Service Server |
| IETF | Internet Engineering Task Force |
| IP | Internet Protocol |
| ISDN | Integrated Services Digital Network |
| ISP | Internet Service Provider |
| Iu-CS | Iu sub Interface for Circuit Switched service |
| Iu-PS | Iu sub Interface for Packet Switched service |
| IWU | Inter Working Unit |
| L1C | Level 1 Control |
| LLC | Logical Link Control (WLAN) |
| M3UA | Message Transfer Part Level 3 SCCP SS7 Adaptation Layer |
| MAC | Medium Access Control |
| MAP | Mobile Application Part |
| MSC | Mobile Switching Centre |
| NAS | Non Access Stratum |
| Node B | Base station in UMTS |
| NRT | Non-Real Time |
| PCM | Pulse Code Modulation |
| PCMCIA | PC Memory Card International Association |
| PCMCIA/HBA | PC Memory Card International Association Host Bus Adapter |
| PDCP | Packet Data Convergence Protocol |
| PLMN | Public Land Mobile Network |
| PPP | Point-to-Point Protocol |
| PS | Packet Switched |
| PSTN | Public Switch Telephone Network |
| RANAP | Radio Access Network Application Part |
| RAN IP | Radio Access Network Internet Protocol |
| RIP GW | RAN IP Gateway |
| RLAN | Radio Local Area Network |
| RLC | Radio Link Control |
| RNC | Radio Network Controller |
| RRC | Radio Resource Control |
| RT | Real Time |
| SCCP/MTP | Signaling Connection Control Part, Message Transfer Part |
| SGSN | Serving GPRS Support Node |
| SCTP | Stream Control Transmission Protocol |
| SIM | Subscriber Identity Module |
| SM | Session Management |
| SMS | Short Message Service |
| SS7 | Signaling System 7 |
| SSCF | Service Specific Coordination Function |

-continued

TABLE OF ACRONYMS

| | |
|---|---|
| SSCOP | Service Specific Connection Oriented Protocol |
| TCP | Transmission Control Protocol |
| TDD | Time Division Duplex |
| UDP/IP | User Data Protocol for the Internet Protocol |
| UE | User Equipment (WTRU for UMTS) |
| UICC | UMTS Integrated Circuit Card |
| UMTS | Universal Mobile Telecommunications System |
| UP | User Plane |
| UTRAN | UMTS Terrestrial Radio Access Network |
| WIN CE | Windows CE |
| WLAN | Wireless Local Area Network |
| WTRU | Wireless Transmit Receive Unit |
| VLR | Visitor Location Register |

DETAILED DESCRIPTION OF THE PREFERRED EMBODIMENTS

The present invention is described with reference to the drawing figures wherein like numerals represent like elements throughout.

The term base station as used herein includes, but is not limited to, a base station, Node B, site controller, Access Point (AP) or other interfacing device in a wireless environment that provides WTRUs with wireless access to a network with which the base station is associated.

The term WTRU as used herein includes, but is not limited to, a user equipment (UE), mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

Figure 1B:
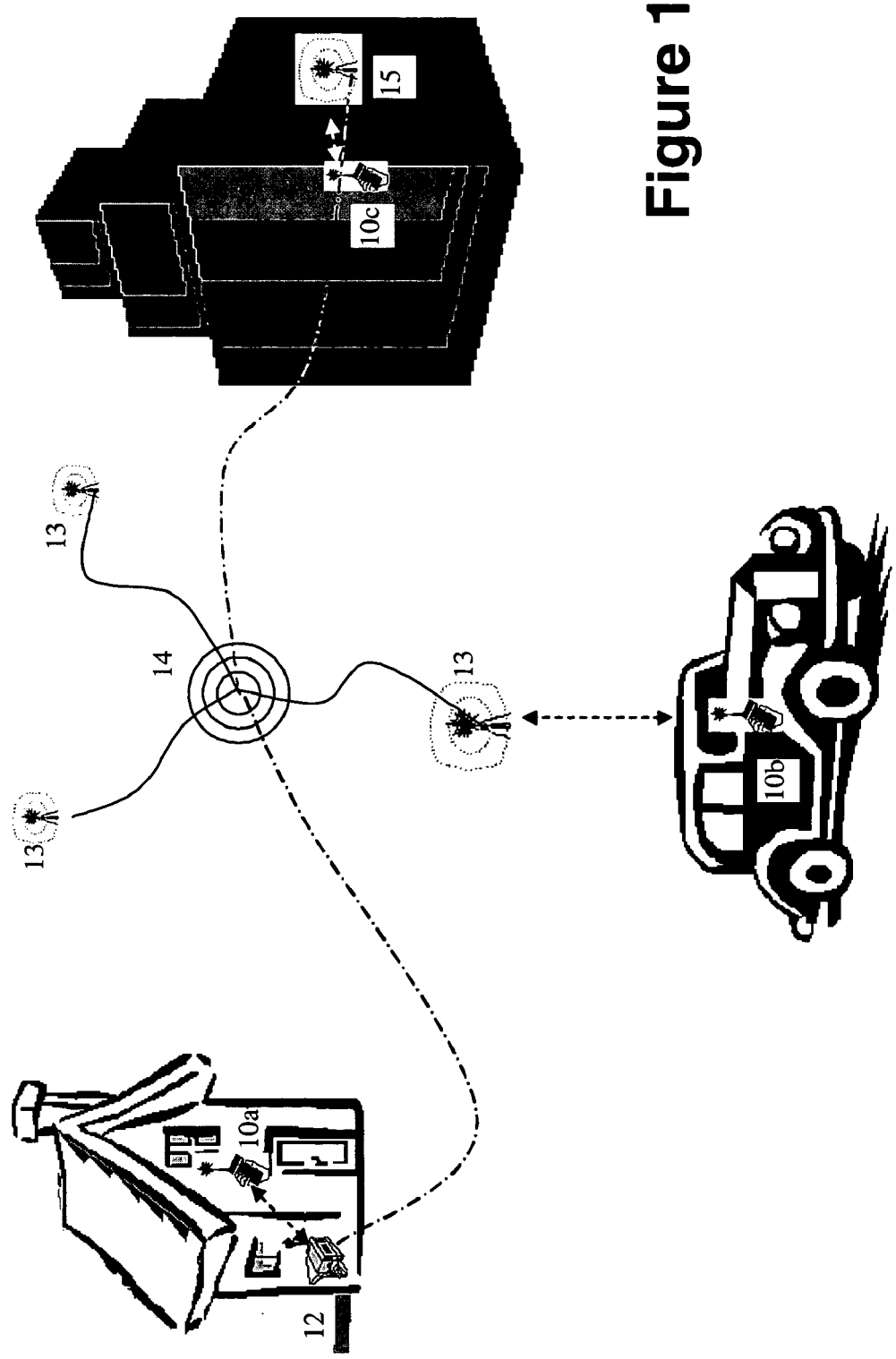
FIG. 1b illustrates an example of a mobile WTRU operating in different networks as it travels from a home WLAN to an office LAN while maintaining a continuous communication in accordance with the teachings of the present invention.

The present invention provides for continuous communication sessions via differing types of wireless radio access networks having one or more networked base stations through which wireless access service is provided for WTRUs. The invention is particularly useful when used in conjunction with mobile units, i.e., mobile WTRUs, as they enter and/or travel through the respective areas of geographic coverage provided by the respective base stations of different types of networks. For example, FIG. 1b illustrates a mobile WTRU 10 at three different locations 10a, 10b, 10c. At location 10a, the WTRU conducts wireless communication with an AP 12 of a home WLAN. At location 10b, the WTRU conducts wireless communication with a Node B 13 of UMTS while traveling between the home WLAN and an office WLAN. At location 10c, the WTRU conducts wireless communication with an AP 15 of an office WLAN. Network connectivity is provided by connections of a CN 14 of the UMTS with the home and office WLANs. The WTRU 10 of the present invention, takes advantage of this network connectivity to maintain an ongoing communication session initiated at the home WLAN 10a and continued at the office WLAN 10c by switching between WLAN and UMTS wireless communications while in transit 10c.

In accordance with the invention, WTRUs are configured for at least two different network modes of operation, preferably, by being equipped with devices providing UMTS UE functionality and wireless local area network (WLAN) WTRU functionality, such as 802.11(b) (WiFi) or Bluetooth compliant functionality. However, the proposed invention is applicable to provide continuity of communication sessions for any other type of wireless network system that interconnects with other types of networks.

Figure 2A:
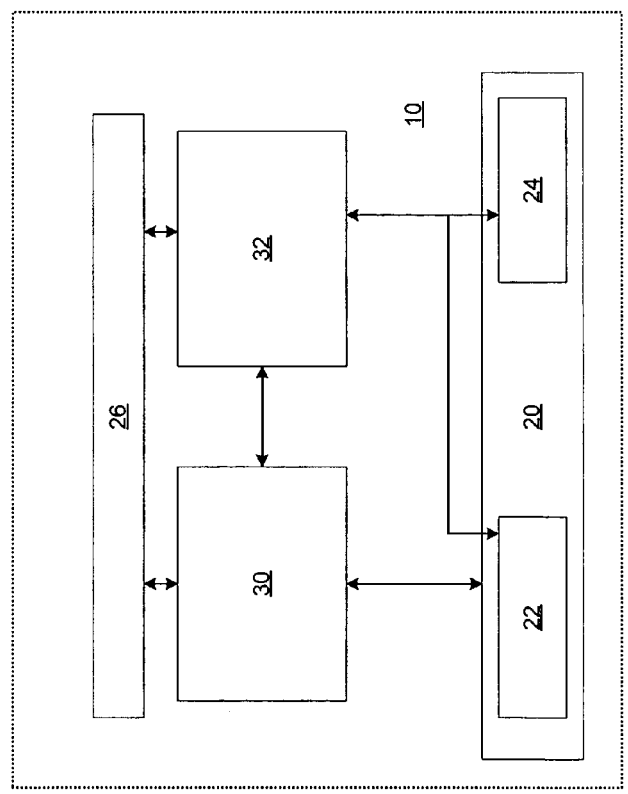
FIG. 2a is a block diagram of a multi-network enabled WTRU in accordance with the teachings of the present invention.

Referring to FIG. 2, a WTRU 10 is provided with a protocol engine 20 having at least two wireless communication interfaces 22, 24, of different types. Each communication interface 22,24 is configured to pass control and user communication data to an application processing component 26 representing conventional upper layers of communication systems. Preferably, one of the wireless communication interfaces 22, 24 is configured for UMTS wireless communications and the other is configured for 802.11 WLAN communications.

The invention provides for the interposition of an Application broker (APP) 30 and a Communications broker (COM) 32 between the wireless interfaces 22, 24 and the upper layer application processing component 26. The APP and COM components 30, 32 process the control and user data preferably as a type of "middleware" that helps in inter-working different technologies by abstracting the underlying base system to enhance performance capabilities. The Application broker 30 and Communications broker 32 provide a two-tier middleware architecture that does not require a change to conventional protocol architectures for the respective wireless networks, easily integrate the different network technologies and provide seamless service to the user.

The APP 30 is configured to monitor the control signaling between the lower layer protocol engine 20 and the upper layer application processing component 26. All user communication data flows through the COM 32 which serves as a switch for the upper layer application processing component 26 to direct such data to the appropriate wireless interface 22, 24 within the lower layer protocol engine 20.

The middleware components 30, 32 can be implemented in the WTRU without corresponding network components. The APP 30 and the COM 32 can operate in such a standalone WTRU scenario to maintain a wireless communication session while switching networks. As such, dual mode operation is supported in the WTRU without overall network support and no "context transfer" or end to end "session awareness" is required.

For example, if the WTRU 10 is conducting a UMTS wireless communication via interface 22 and travels into a WLAN service area the communication session is preferably switched to WLAN wireless communication via interface 24 in a WTRU standalone mode as follows. The protocol engine 20 provides link status information which is received and evaluated by the APP 30 and a determination is made to switch to WLAN wireless communications. This decision can be based on Quality of Service (QoS) of the existing UMTS or other factors such as disclosed in U.S. patent application Ser. No. 10/667,633 owned by the assignee of the present invention. After the APP 30 determines the ongoing UMTS communication session should be handed over to a WLAN, the APP 30 signals the COM 32 to prepare for handoff and the COM 32 begins to buffer all communication data being generated by the upper layer application processing component 26 for wireless transmission. Accordingly, the processing component 26 continues its generation of user data for the communication session without interruption. The APP 30 communications to the upper layer application processing component 26 that handoff is in progress so that it can anticipate a delay in receiving wireless data until the handoff is complete. The APP 30 then directs the protocol engine 20 to establish a wireless WLAN connection via interface 24 to which the UMTS communication session is to be handed.

The protocol engine 20 signals the APP 30 when the WLAN connection is established. The App 30 then signals handoff completion to the COM 32 which in turn switches the direction of the user communication data from the UMTS interface 22 to the WLAN interface 24 and releases the buffered data to the WLAN interface to update and continue the communication session. The APP also signals handoff completion to the upper layer application processing component 26 so the bi-direction user data for the communication session continues traveling via the COM 32 and WLAN interface 24. Finally, the APP 30 signals the protocol engine to have the UMTS interface release the UMTS connection.

Figure 2B:
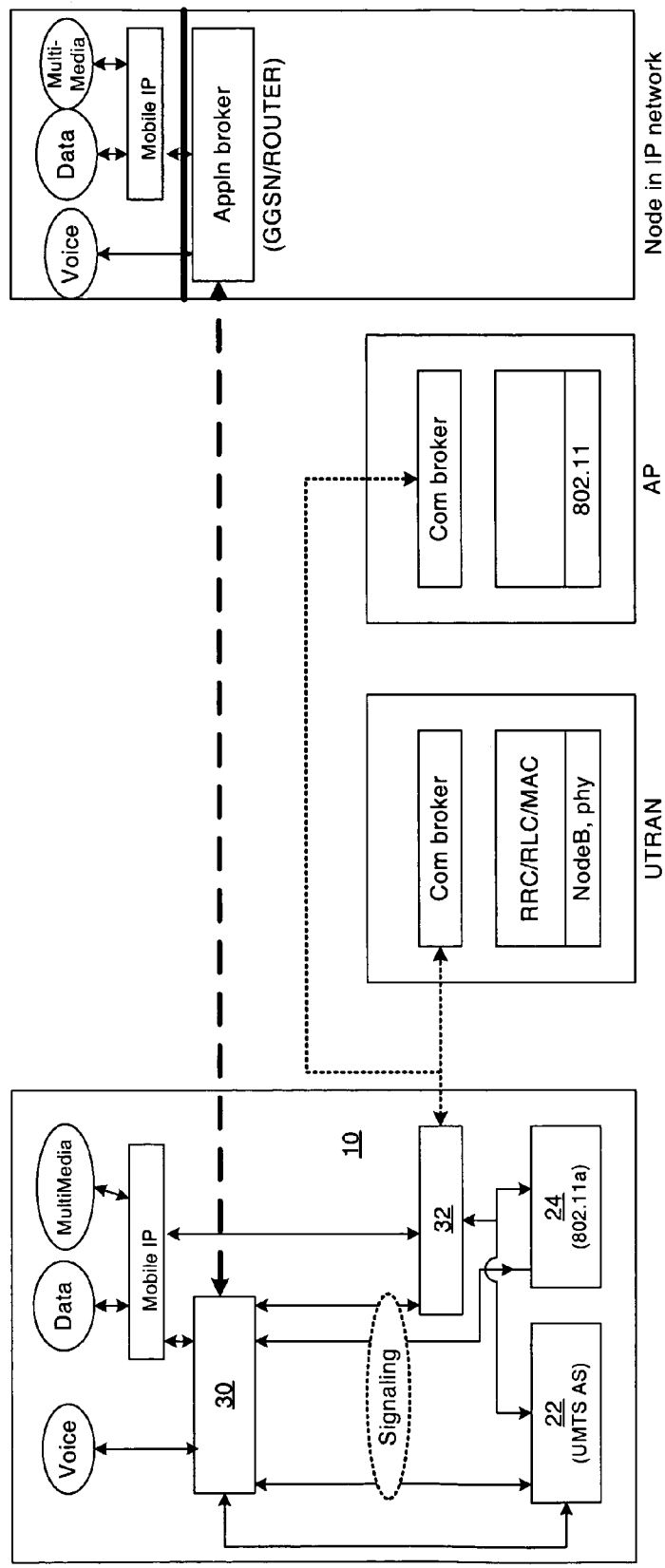
FIG. 2b is an illustration of a multi-network interface of a multi-network enabled WTRU in accordance with the teachings of the present invention.

For enhanced operation, corresponding APP and COM components can be provided in the networks with which the WTRU 10 is communicating. FIG. 2b provides a schematic diagram of the layout of the various components. Network system interfacing between UMTS systems and WLAN systems are typically based on Packet Switched (PS) data flows such as using an Internet Protocol (IP). FIG. 2b illustrates a WTRU configured to permit network handoff for packet switched IP sessions. CS voice signal data can pass through the APP from the UMTS interface, but voice communications are possible to implement in both a WLAN and a UMTS using a voice over IP protocol where voice data is processed in packets.

As reflected in FIG. 2b, the APP 30 of WTRU 10 brokers the signaling with the wireless interfaces 22, 24 between higher layers and the COM 22. The WTRU 10 is configured to pass PS data to and from the wireless interfaces 22, 24 through the COM 32. Preferably, the UMTS and WLAN systems with which the WTRU communicates have UTRANs and APs, respectively, configured with corresponding Communication Brokers implemented above their respective physical layer air interfaces as illustrated in FIG. 2b. A corresponding Application broker is preferably provided in an IP node of the network systems. The network side APPs and COMs provide network support for inter-network handover.

Figure 2C:
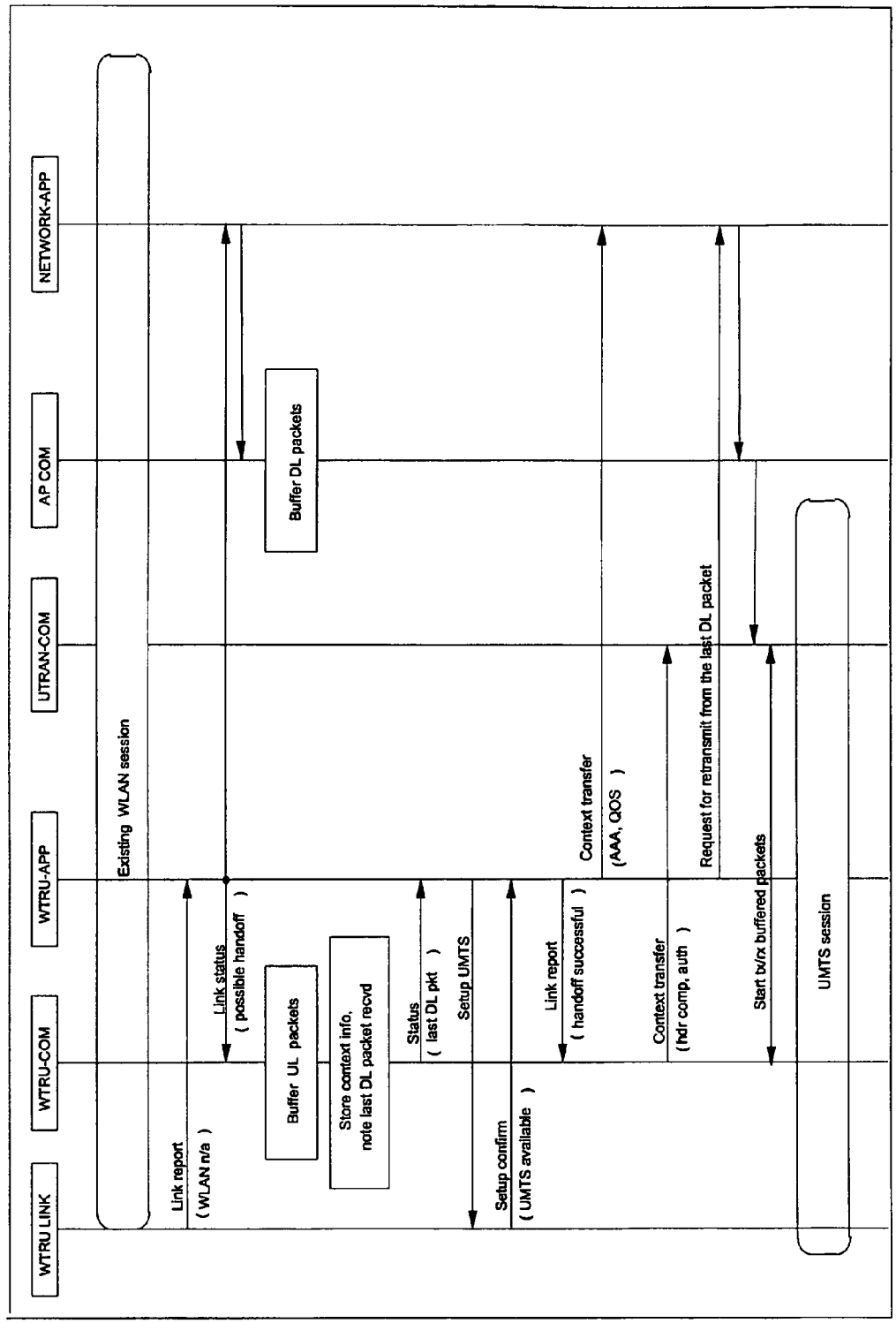
FIG. 2c is a process diagram illustrating the switching of a communication session from a wireless connection via a WLAN to a wireless connection via a UMTS without loss of connectivity in accordance with the teachings of the present invention.

In the context of the multi-network system illustrated in FIG. 2b, an example of the WTRU 10 switching from a WLAN connection to a UMTS connection during a communication session with network support is illustrated in FIG. 2c. During an existing WLAN session, control and user data pass through the WTRU's APP 30 and COM 32, respectively, and over the WTRU's communication link via an AP of the WLAN. The user data passing through the COM of the AP and the control data passing to a network APP. When the communications link reports data to the WTRU APP 30 based on which the APP determines the link should be switched to a UMTS, the WTRU APP 30 signals the WTRU COM 32 to begin buffering up link user communication data and also signals the network APP which in turn signals the AP COM to begin buffering down link user communication data. The WTRU COM 32 also preferably stores contest information related to the user data, notes the last down link packet received from the AP and identifies the last received down link packet to the WTRU APP 30. The WTRU APP 30 then directs the WTRU interface to set up a UMTS link. Provided a UMTS link is available, it is set up and the WTRU link via a UMTS UTRAN is confirmed to the WTRU APP 30. The WTRU APP 30 then confirms this to the WTRU COM 32 and preferably signals to the network APP via the UMTS connection context information including AAA and QoS information. The WTRU COM 32 also preferably signals context in formation relate to the user communication data to the UTRAN COM. The WTRU APP 30 also signals the network APP the identity of the last received downlink packet with a request to resume communications which in turn is signaled by the network APP to the AP COM. The AP COM releases the buffered downlink data to the UTRAN COM preferably starting with the next successive packet following the packet identified as last received downlink packet. The buffered data is then exchanged via the UMTS connection through the WTRU COM 32 and the UTRAN COMM. The communication then continues as normal via the UMTS connection.

Figure 3:
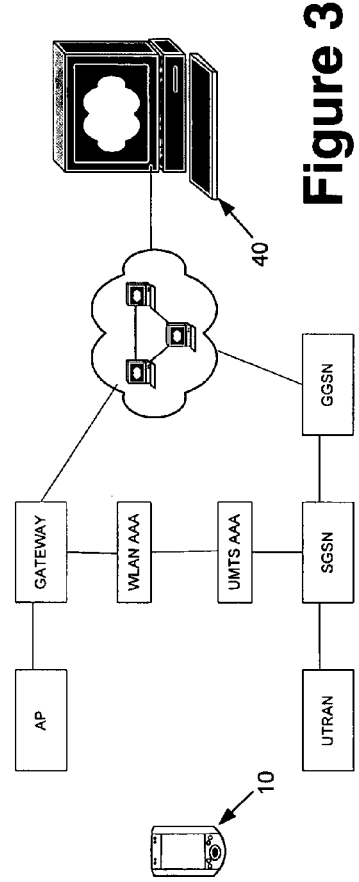
FIG. 3 is an illustration of a multi-network operating environment for a multi-network enabled WTRU in accordance with the teachings of the present invention.

With reference to FIG. 3, a block diagram of the WTRU 10 in the context of a multi-network environment which includes internet connectivity. The WLAN network includes an Access Point (AP) connected to a WLAN Gateway that has an associated WLAN AAA tracking component. The UMTS includes a UTRAN and AAA, SGSN and GGSN Core Network components. The WLAN interfaces with the internet through the WLAN Gateway and the UMTS interfaces with the internet via the GGSN component of the UMTS CN. Preferably, there is an AAA interface between the WLAN AAA and UMTS AAA components.

In the context of the multi-network system illustrated in FIG. 3, an example of the WTRU 10 switching from a WLAN connection to a UMTS connection during a communication session with an internet connected device 40 proceeds as follows. When the communications link status indicates to the WTRU APP 30 that the link should be switched to a WLAN link, the WTRU APP 30 signals the WTRU COM 32 to begin buffering up link user communication data. The WTRU COM 32 also preferably stores contest information related to the user data, notes the last down link packet received from the UTRAN and identifies the last received down link packet to the WTRU APP 30. The WTRU APP 30 then receives AAA context information from the UMTS AAA control and directs the WTRU interface to set up a UMTS link. A WLAN link is set up and the WTRU link via a WLAN UTRAN is confirmed to the WTRU APP 30. The WTRU APP 30 then confirms establishment of the WLAN link to the WTRU COM 32 and preferably also appropriately converts the AAA context data and signals it to the WLAN AAA component. The WTRU COM 32 then releases the buffered uplink data to the internet connected device 40. The communication then continues as normal between the WTRU 10 and the internet connected device 40 via the WLAN connection.

Figure 4A:
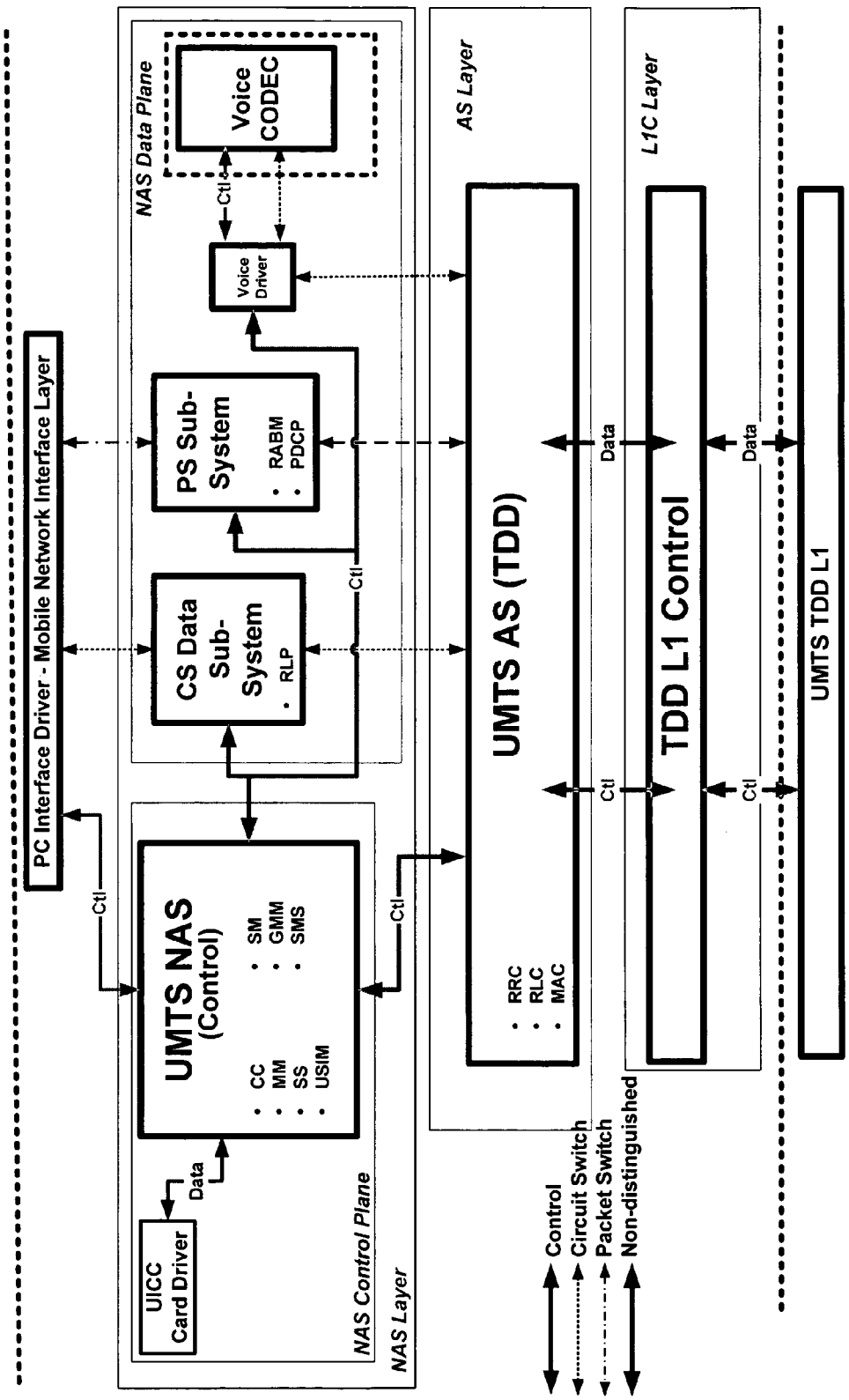
FIG. 4a is a layout diagram of a UMTS device architecture design configured to interface with a computing device, such as via a standard PCMCIA/HBA interface.
Figure 4B:
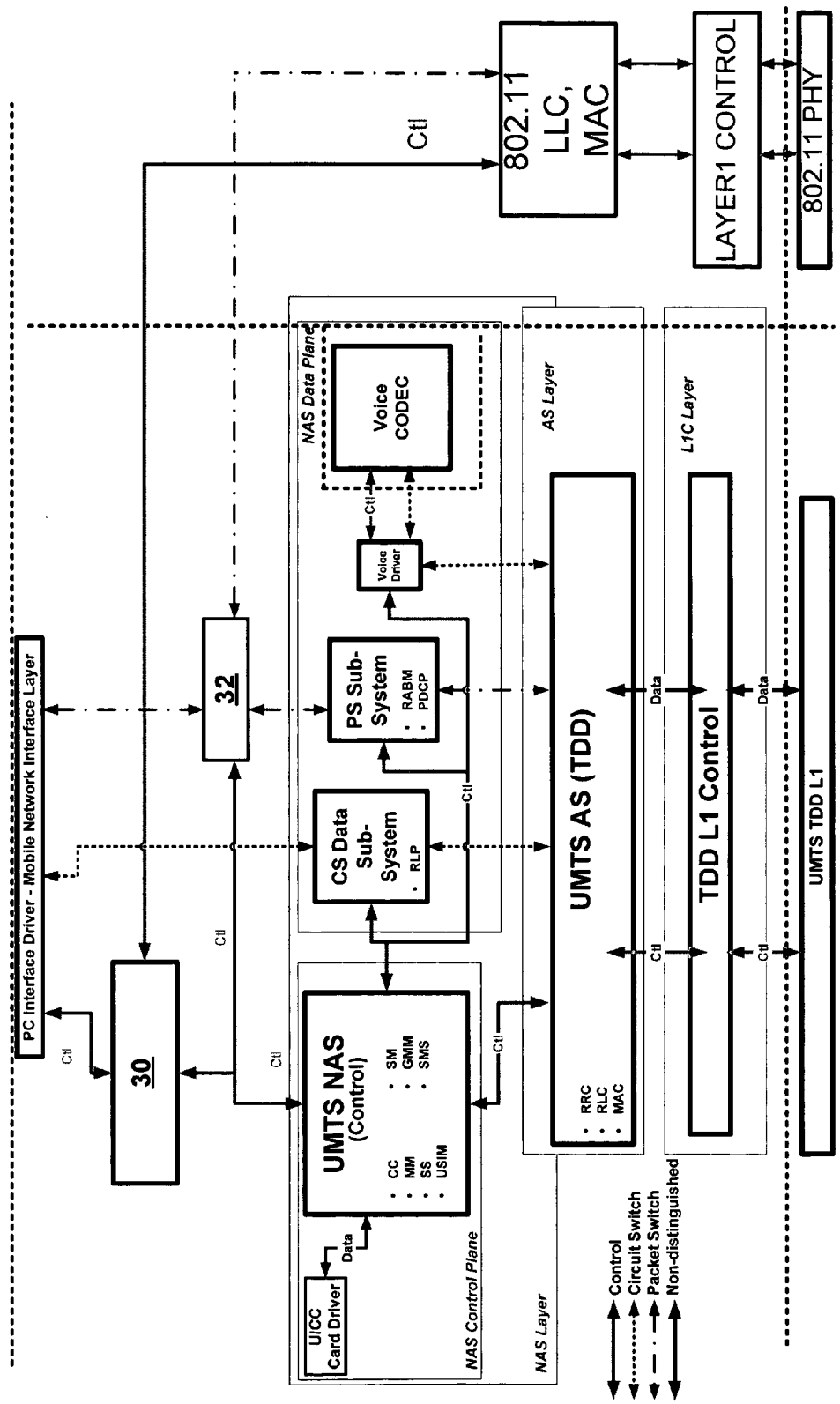
FIG. 4b is a layout diagram of dual UMTS/WLAN network device architecture design configured to interface with a computing device, such as via a standard PCMCIA/HBA interface, in accordance with the teachings of the present invention.

Referring to FIGS. 4a and 4b, there is shown an implementation of the APP and COM components device configured to interface with a computing device, such as via a standard PCMCIA/HBA interface. FIG. 4a illustrates a layout diagram of a UMTS device architecture design configured to interface with a computing device, such as via a standard PCMCIA/HBA interface. Non Access Stratum (NAS), Access Stratum (AS), Layer 1 Control (L1C) and physical layer (Layer 1) components are illustrated with data paths of control signals and user data, including both packet switched (PS) and circuit switched (CS) data paths. The NAS layer is coupled to a standard computer interface for coupling via a standard PCMCIA/HBA interface connector.

FIG. 4b illustrates a modification of the device of FIG. 4a to provide a dual UMTS/WLAN network device architecture in accordance with the teachings of the present invention. An Application broker 30 is disposed in the control signal path between the NAS layer and the computer interface. A Communications broker 32 that is coupled with the APP 30 is disposed in the PS data path between the NAS layer and the computer interface. WLAN interface components are provided preferably including an 802.11 compliant physical layer, Layer 1 Control components and 802.11 compliant Medium Access Control (MAC) and Logical Link Control (LLC) components. The Medium Access Control (MAC) and Logical Link Control (LLC) components have a control signal path coupled with the APP 30 and a PS data path coupled with the COM 32.

Figure 5B:
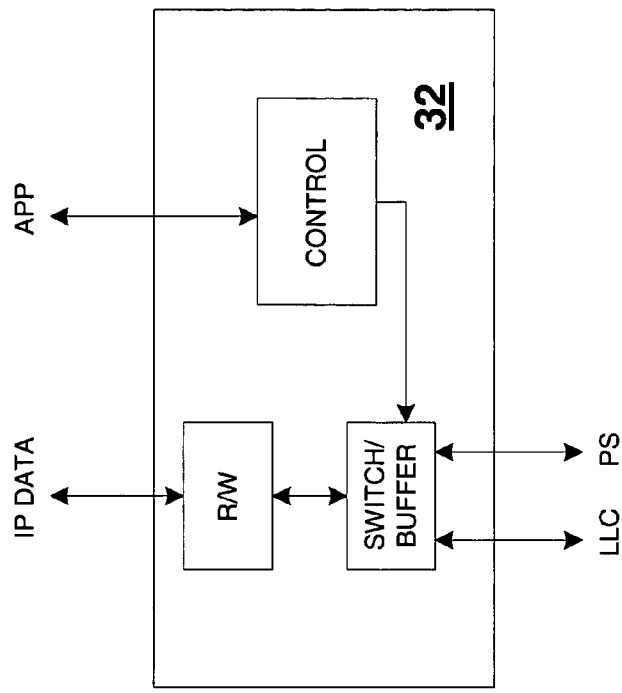
FIG. 5b is a block diagram of a preferred example of functionality details of a Communication broker component for a WTRU in accordance with the teachings of the present invention.
Figure 5A:
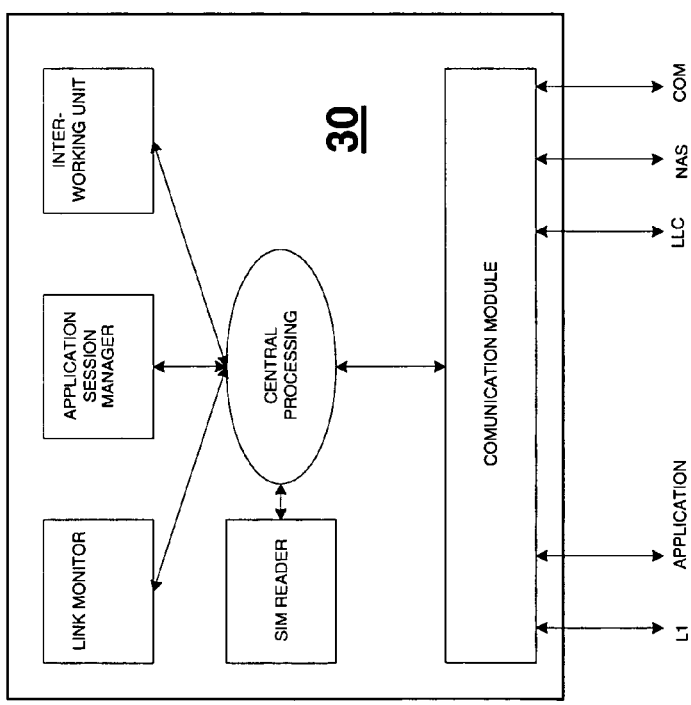
FIG. 5a is a block diagram of a preferred example of functionality details of an Application broker component for a WTRU in accordance with the teachings of the present invention.

Preferred detailed configuration layouts of the APP 30 and COM 32 components are illustrated in FIGS. 5a and 5b, respectively. The APP 30 preferably includes a communication module coupled with a central processing unit. The communication module has external connections for the couplings with the higher layer processing (application), the WLAN interface via LLC control (LLC), the UMTS interface via NAS level control (NAS) and the COM 32 (COM). An L1 connection is also directly provided to the physical layer to assist in the monitoring of link status.

The APP 30 preferably includes Link Monitor, Application Session Manager, Inter-Working Unit and Subscriber Identity Module (SIM) Reader components associated with its central processing unit. The Link Monitor component is configured to monitor link status and to trigger hand off from one type of wireless network link to the other if selected criteria are net. The Application Session Manager is configured to controls the signaling during handoff. The Inter-Working Unit is configured to maintain and convert AAA, QoS profile and other context information for transmission during handoff. The SIM Reader is configured to read a SIM containing the user's identity for AAA functioning.

The COM 32 is preferably configured with a Control component, a Switch/Buffer device and a read/write (R/W) device. The control component is configured to control the switching of the PS-data flow between the UMTS and WLAN interfaces depending upon the type of wireless connection and has a connection coupled with the APP 30 for receiving control signals. The Switch/Buffer and R/W devices are disposed in the PS data path between the two interfaces and the higher layer processing. The Switch/Buffer has a WLAN connection (LLC) and a UMTS connection (PS) and the PS data flow is through one or the other connection as controlled by the Control component. The Switch/Buffer and R/W devices are to interrupt the data flow from the high layer connection (IP Data) and buffer the data received during handover and then release the buffered data once the new network connection is established and the data path is switched by the Control component.

Figure 6A:
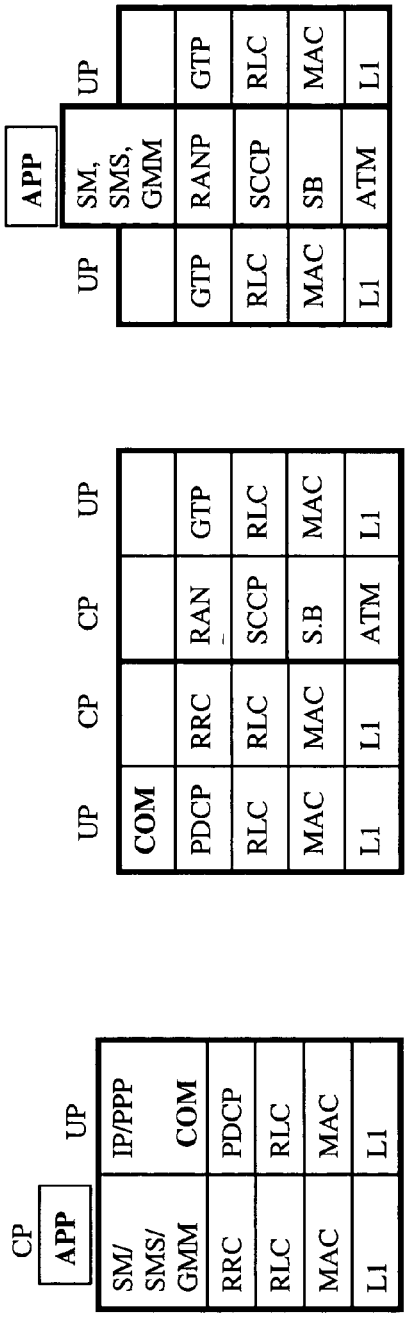
FIG. 6a is a protocol stack diagram illustrating preferred locations of the operation of the inventive components in the UE, UTRAN and SGSN in a 3GPP context.
Figure 6B:
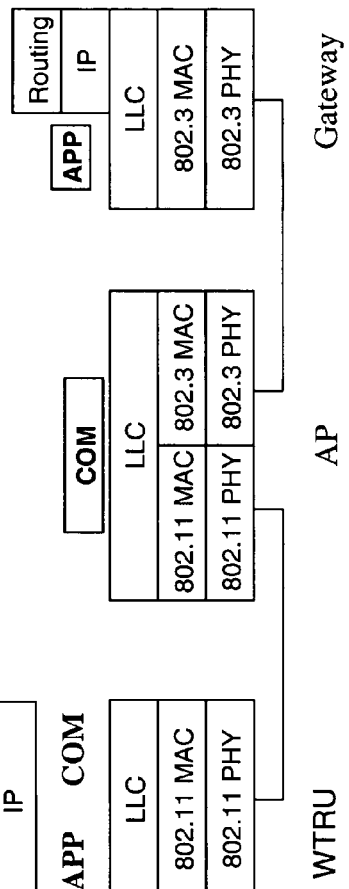
FIG. 6b is a protocol stack diagram illustrating preferred locations of the operation of the inventive components in a WLAN context.

For completeness, FIGS. 6a and 6b are provided to illustrate the preferred WTRU and network locations of the APP and COM in UMTS and WLAN protocol stacks respectively. FIG. 6a illustrate the APP within the Control Plane (CP) protocol stacks and the COM within the User Plane (UP) protocol stacks of a UMTS network. FIG. 6b illustrates the APP and COM locations in WLAN protocol stacks for the WTRU, a WLAN AP and a WLAN gateway configured with a 802.11 compliant wireless interface and a 802.3 intra-WLAN interface.

The ability to create UMTS and WLAN (standard 802.11) inter-working is the culmination of an evolution path comprising the steps of roaming, handoff, and seamless handoff, ending in the present dual mode WTRU. Network interface strategies are addressed in the 3GPP Technical Report TR 23.934. The present invention addresses the seamless handoff situation providing an architecture that supports seamless handoff with no coupling, or loose coupling, or tight coupling scenarios.

Figure 7:
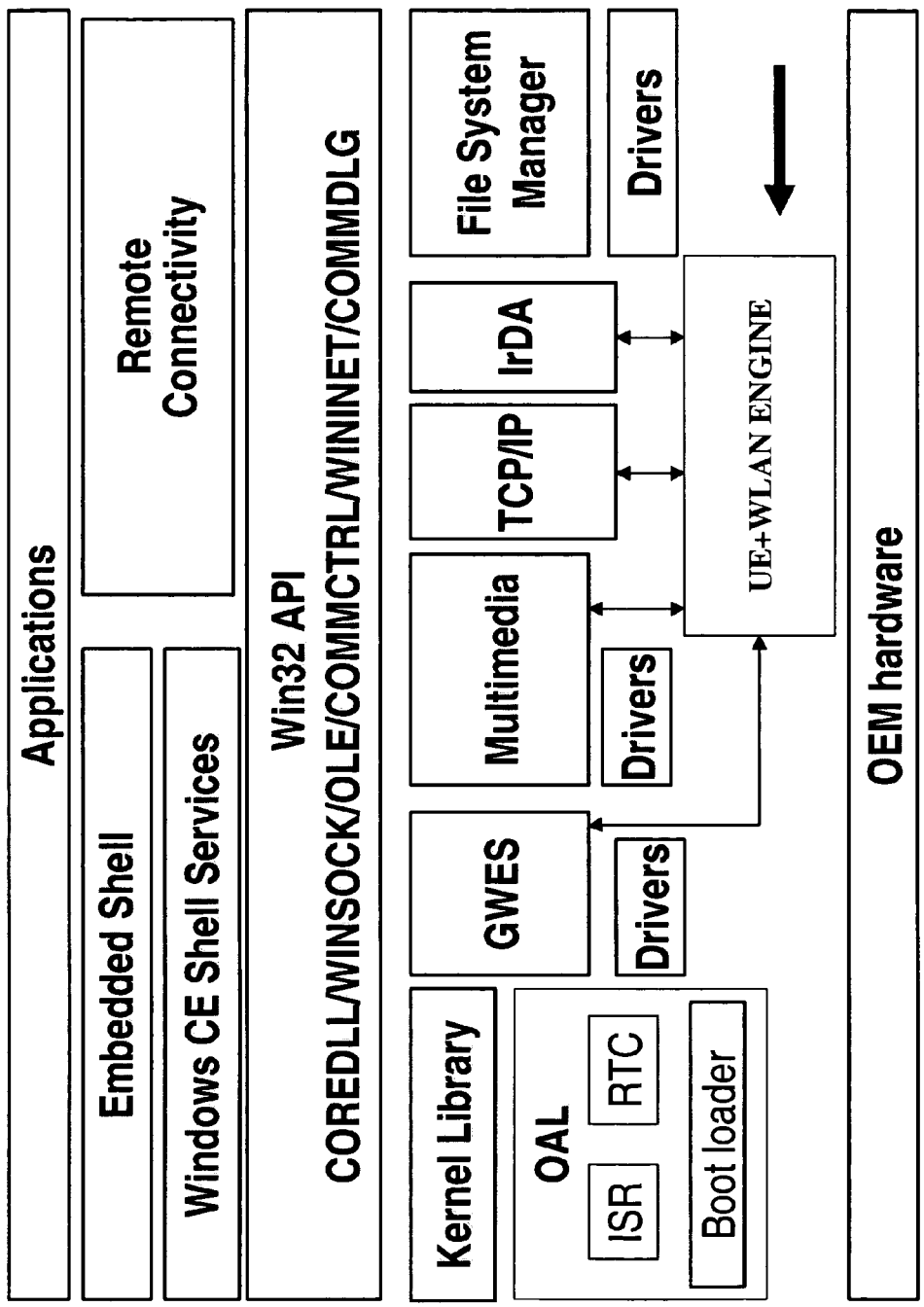
FIG. 7 is a diagrammatic illustration of the location of the inventive components for operation with a WIN CE context.

The new APP and COM components can be extended to integrate any access technology. FIG. 7 is a diagrammatic illustration of the location of these components in a dual wireless interface device (UE+WLAN Engine) such as illustrated in FIG. 4b for operation within a WIN CE context.

Exemplary attributes of the COM broker include ability to abstract the transport mechanism to upper layers. Although described above for PS data, the COM, being on the user plane can be implemented to routes user data in the form of CS and/or PS data depending on the current system to which is attached. From a UMTS point of view the COM component preferably resides on top of PDCP/RLC/MAC/PHY protocols. The COM can be implemented as a generic software component which can be adapted to any access technology.

Exemplary attributes of the Access Broker (APP) include the ability to abstracts all applications at session and presentation layers. The APP preferably resides on the signaling (control) plane (CP), collects reports of link quality and has the ability to triggering handoff and assists in session re-establishment.

Preferably, the APP and COM components are implemented on an single integrated circuit, such as an application specific integrated circuit (ASIC) which may also include the UMTS and WLAN interface components. However, portions of the processing components may also be readily implemented on multiple separate integrated circuits.

WTRU configurations and methods have been described for use with UMTS and WLAN systems. However, the present invention can be implemented for any wireless communications network system where the WTRUs are configured to communicate with multiple types of wireless networks.

What is claimed is:

1. A wireless transmit/receive unit (WTRU) for communication in at least two types of wireless networks comprising:
    a protocol engine having at least two wireless communication interfaces, each wireless, communication interface configured for wireless linking with a different type of wireless network wherein one of the wireless communication interfaces is configured for UMTS wireless communications and another one of the wireless communication interfaces is configured for 802.11 WLAN communications;
    each communication interface configured to pass control signals and user communication data to a common application processing component;
    an application broker configured to monitor control signaling between the lower layer protocol engine and the upper layer application processing component and to read a user's identity;
    a communications broker having a data buffer and defining a switchable data path for user data between the upper layer application processing component and a selected one of the wireless interfaces;
    the application broker associated with the communications broker to control data buffering and data path switching by the communications broker such that data flowing to a first wireless interface of the protocol engine during a communication session is buffered while a wireless link is established with a different second wireless interface of the protocol engine for the communication session and the communication broker data path is switched to the second wireless interface and the buffered data is released therethrough after a wireless link is established for the communication session via the second wireless interface;

the application broker including a link monitor and configured to trigger the initiation of a wireless link through a different wireless interface based upon monitored link data meeting predetermined criteria; and the application broker including an Application Session Manager configured to control signaling during the establishment of a wireless link through a different wireless interface and an inter-working unit configured to maintain and convert context information for transmission during the establishment of a wireless link through a different wireless interface.

2. The invention of claim 1 wherein the communication broker data path is configured to transport packet switched data.

3. The invention of claim 1 wherein a data path is defined for circuit switch data between the upper layer application processing component and the UMTS wireless interface.

4. The invention of claim 1 wherein the application broker includes a Subscriber Identity Module (SIM) reader configured to read a SIM containing the user's identity.

5. The invention of claim 1 wherein the communication broker data path is configured to transport packet switched data.

6. A wireless link handover method for a wireless transmit/receive unit (WTRU) for switching a wireless link from a first to a second type of wireless network during a communication session wherein the WTRU has a protocol engine having first and second wireless communication interfaces configured for wireless linking with the first and second types of wireless networks where one of the wireless communication interfaces is configured for UMTS wireless communications and the other wireless communication interface is configured for 802.11 WLAN communications, respectively, each communication interface configured to pass control signals and user communication data to a common application processing component, the method comprising:

providing a data buffer and a switchable data path for user data between the upper layer application processing component and a selected one of the wireless interfaces, monitoring control signaling between the lower layer protocol engine and the upper layer application processing component and reading a user's identity; and controlling the data buffer and data path switching such that data flowing to the first wireless interface of the protocol engine during the communication session is buffered while a wireless link is established with the second wireless interface of the protocol engine for the communication session and the data path is switched to the second wireless interface and the buffered data is released therethrough after a wireless link is established for the communication session via the second wireless interface wherein the initiation of a wireless link through the second wireless interface is triggered based upon monitored link data meeting predetermined criteria, and wherein an Application Session Manager controls signaling during the establishment of a wireless link through the second wireless interface and an inter-working unit maintains and converts context information for transmission during the establishment of a wireless link through the second wireless interface.

7. The method of claim 6 wherein a WLAN wireless link is switched to a UMTS wireless link and the first wireless communication interface is configured for UMTS wireless communications and the second wireless communication interface is configured for 802.11 WLAN wireless communications.

8. The method of claim 6 wherein a UMTS wireless link is switched to a WLAN wireless link and the first wireless communication interface is configured for 802.11 WLAN wireless communications and the second wireless communication interface is configured for UMTS wireless communications.

9. The method of claim 6 wherein the switchable data path transports packet switched data.

10. An application specific integrated circuit (ASIC) for a wireless transmit/receive unit (WTRU) configured for communication in at least two types of wireless networks and having a protocol engine having at least two wireless communication interfaces where each wireless communication interface configured for wireless linking with a different type of wireless network where one of the wireless communication interfaces is configured for UMTS wireless communications and another one of the wireless communication interfaces is configured for 802.11 WLAN communications and to pass control signals and user communication data to a common application processing component, the ASIC comprising:

an application broker configured to monitor control signaling between the lower layer protocol engine and the upper layer application processing component and to read a user's identity;

a communications broker having a data buffer and defining a switchable data path for user data between the upper layer application processing component and a selected one of the wireless interfaces;

the application broker associated with the communications broker to control data buffering and data path switching by the communications broker such that data flowing to a first wireless interface of the protocol engine during a communication session is buffered while a wireless link is established with a different second wireless interface of the protocol engine for the communication session and the communication broker data path is switched to the second wireless interface and the buffered data is released therethrough after a wireless link is established for the communication session via the second wireless interface;

the application broker including a link monitor and configured to trigger initiation of a wireless link through a different wireless interface based upon monitored link data meeting predetermined criteria; and the application broker including an Application Session Manager configured to controls the signaling during the establishment of a wireless link through a different wireless interface and an inter-working unit configured to maintain and convert context information for transmission during the establishment of a wireless link through a different wireless interface.

11. The invention of claim 10 wherein the application broker includes a Subscriber Identity Module (SIM) reader configured to read a SIM containing the user's identity.

12. The invention of claim 10 wherein the communication broker data path is configured to transport packet switched data.

* * * * *

UNITED STATES PATENT AND TRADEMARK OFFICE
CERTIFICATE OF CORRECTION

PATENT NO. : 6,987,985 B2
APPLICATION NO. : 10/737369
DATED : December 16, 2003
INVENTOR(S) : Purkayastha et al.

It is certified that error appears in the above-identified patent and that said Letters Patent is hereby corrected as shown below:

At column 3, line 30, after the word "by", delete "manufactures" and insert therefor --manufacturers--.

At column 3, line 66, after the word "network", delete "which" and insert therefor --while--.

At column 4, line 12, after the word "providing", delete "a n" and insert therefor --an--.

At column 4, line 51, after the word "to", delete "controls" and insert therefor --control--.

At column 8, line 9, after the word "interface", delete "22,24" and insert therefor --22, 24--.

At column 8, line 56, after the word "determines", insert --that--.

At column 9, line 5, after the word "The", delete "App" and insert therefor --APP--.

At column 10, line 2, after the word "context", delete "in formation relate" and insert therefor --information related--.

At column 11, line 26, after the word "are", delete "net" and insert therefor --met--.

At column 11, line 27, after the word "to", delete "controls" and insert therefor --control--.

At column 11, line 52, after "6a", delete "illustrate" and insert therefor --illustrates--

At column 11, line 57, delete both instances of "a" and insert therefor --an--.

At column 12, line 10, after the word "to", delete "routes" and insert therefor --route--.

At column 12, line 11, after the word "which", insert --it--.

At column 12, line 18, after the word "to", delete "abstracts" and insert therefor --extract--.

UNITED STATES PATENT AND TRADEMARK OFFICE
CERTIFICATE OF CORRECTION

PATENT NO. : 6,987,985 B2
APPLICATION NO. : 10/737369
DATED : December 16, 2003
INVENTOR(S) : Purkayastha et al.

It is certified that error appears in the above-identified patent and that said Letters Patent is hereby corrected as shown below:

In claim 1, column 12, line 40, after the word "wireless", delete ".".

In claim 10, column 14, line 52, after the word "to", delete "controls" and insert therefor --control--.

Signed and Sealed this

Eighth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,987,985 B2
APPLICATION NO. : 10/737369
DATED : January 17, 2006
INVENTOR(S) : Purkayastha et al.

It is certified that error appears in the above-identified patent and that said Letters Patent is hereby corrected as shown below:

At column 3, line 30, after the word "by", delete "manufactures" and insert therefor --manufacturers--.

At column 3, line 66, after the word "network", delete "which" and insert therefor --while--.

At column 4, line 12, after the word "providing", delete "a n" and insert therefor --an--.

At column 4, line 51, after the word "to", delete "controls" and insert therefor --control--.

At column 8, line 9, after the word "interface", delete "22,24" and insert therefor --22, 24--.

At column 8, line 56, after the word "determines", insert --that--.

At column 9, line 5, after the word "The", delete "App" and insert therefor --APP--.

At column 10, line 2, after the word "context", delete "in formation relate" and insert therefor --information related--.

At column 11, line 26, after the word "are", delete "net" and insert therefor --met--.

At column 11, line 27, after the word "to", delete "controls" and insert therefor --control--.

At column 11, line 52, after "6a", delete "illustrate" and insert therefor --illustrates--

At column 11, line 57, delete both instances of "a" and insert therefor --an--.

At column 12, line 10, after the word "to", delete "routes" and insert therefor --route--.

At column 12, line 11, after the word "which", insert --it--.

At column 12, line 18, after the word "to", delete "abstracts" and insert therefor --extract--.

UNITED STATES PATENT AND TRADEMARK OFFICE
CERTIFICATE OF CORRECTION

PATENT NO. : 6,987,985 B2
APPLICATION NO. : 10/737369
DATED : January 17, 2006
INVENTOR(S) : Purkayastha et al.

It is certified that error appears in the above-identified patent and that said Letters Patent is hereby corrected as shown below:

In claim 1, column 12, line 40, after the word "wireless", delete ".".

In claim 10, column 14, line 52, after the word "to", delete "controls" and insert therefor --control--.

This certificate supersedes Certificate of Correction issued August 8, 2006.

Signed and Sealed this

Twelfth Day of September, 2006

JON W. DUDAS
*Director of the United States Patent and Trademark Office*